Jan. 2, 1973　　　L. M. NIEBYLSKI　　　3,708,380
COMPOSITE SANDWICH PANEL TYPE CONSTRUCTION
Filed June 21, 1971

United States Patent Office 3,708,380
Patented Jan. 2, 1973

3,708,380
COMPOSITE SANDWICH PANEL TYPE
CONSTRUCTION
Leonard M. Niebylski, Birmingham, Mich., assignor to
Ethyl Corporation, New York, N.Y.
Filed June 21, 1971, Ser. No. 155,103
Int. Cl. B32b 3/02, 3/26, 15/00
U.S. Cl. 161—43    19 Claims

ABSTRACT OF THE DISCLOSURE

A composite sandwich panel type construction comprising two independent outer layers attached to opposite sides of foamed metal core, said core having Z-shaped reinforcing elements therein. A preferred panel construction has one outer layer extending around said foamed metal core so as to substantially encase said core. Methods of fabricating such a panel construction (1) by casting said foamed aluminum around said reinforcing elements and subsequently attaching said outer layers to this integral metal foam/reinforcing element core structure, and (2) by first preparing said core from individual metal foam pieces which are then attached to performed Z-shaped reinforcing elements, said assembled core structure then having the outer layers attached thereto.

Compared to the composite sandwich panel construction having no Z-shaped reinforcing elements in said core, the present construction has substantially improved strength.

BACKGROUND OF THE INVENTION

A sandwich panel construction wherein outer layers are bonded to a foamed metal core is described in a copending application, Ser. No. 30,469, filed April 21, 1970. This sandwich type construction provides panels which are (1) relatively light weight, (2) warp resistant, (3) resistant to ordinary aging and oxidation, (4) fire proof, and (5) having good strength and reflection characteristics.

The load-carrying capacity and general strength of this type construction are dramatically improved by providing Z-shaped reinforcing elements within the foamed metal core. This improved composite sandwich panel type construction extends its usefulness in heavier duty applications.

SUMMARY OF THE INVENTION

Composite sandwich panel type construction comprising two outer layers attached to opposite sides of a foamed metal core having Z-shaped reinforcing elements providing therein; method of fabricating such a panel construction.

BRIEF DESCRIPTION OF THE DRAWINGS

FIG. 1 illustrates a full view of a reinforced panel in partial section. The metal foam core 1 has Z-shaped metal reinforcing elements 2 (with full position of said elements shown in phantom) bonded to said foam with an adhesive 6; and has one outer layer of a fiberglass mat 3 reinforced thermoset organic polymer 4 and the other outer layer of metal sheet 5 which extends around and encases said reinforced core. An adhesive 7 bonds the core structure to the metal outer layer 5.

FIG. 2 illustrates a metal Z-shaped reinforcing element 2 having perforations 2a therein.

DESCRIPTION OF THE PREFERRED EMBODIMENTS

Figure 1:
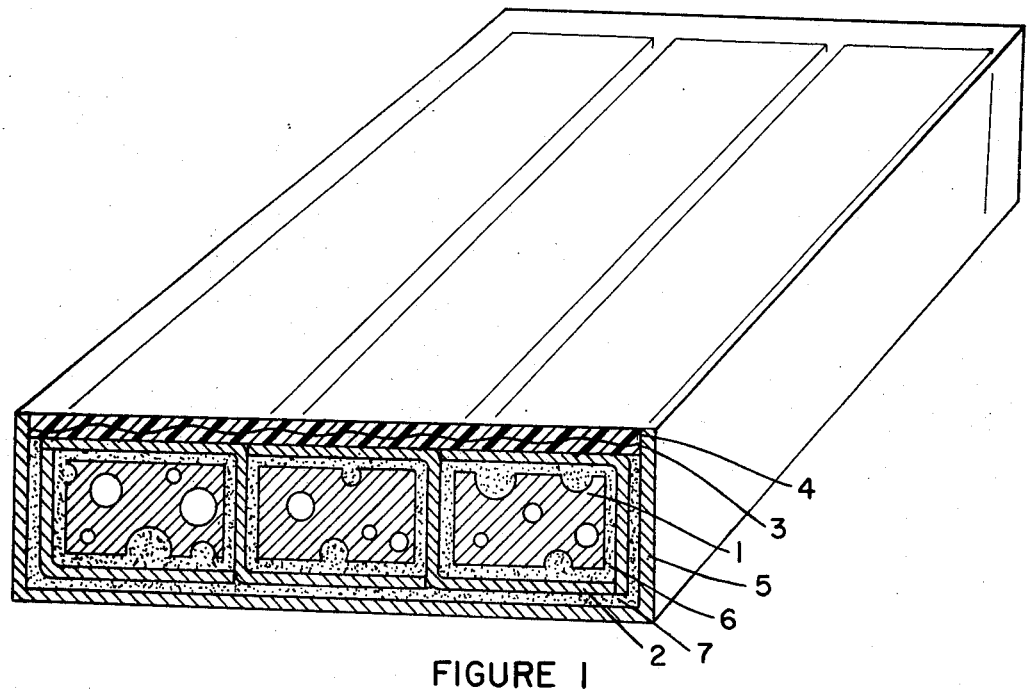
FIGS. 1 and 2 illustrate the sandwich panel type construction of the present invention and are not to scale. The same numbers are used to designate the same elements in each figure.

An embodiment of this invention is a composite sandwich panel construction where two layers of material which is solid at ordinary room temperature are attached to a foamed metal core which has Z-shaped reinforcing elements in and attached thereto. The Z-shaped elements are positioned in said foam so that the parallel faces of the elements are attached to opposite sides of said foam; and the perpendicular portion joining the parallel sides of said Z-shaped element is within said foam. The layers attached to said core may be independent sheets or may be applied as fluid coatings which will solidify after being applied to the foamed metal core. A preferred embodiment uses a foamed aluminum core having perforated metal Z-shaped reinforcing elements therein and has one outer metal layer which extends around and encases said core. The density of the foamed aluminum portion of the core may range from about 5 to about 35 p.c.f. (pounds per cubic foot), preferably from about 5 to 30 p.c.f.; and more preferably from 8 to 27 p.c.f.; and most preferably about 15–18 p.c.f.

The outer layers which are attached to the foamed metal core having Z-shaped reinforcing elements therein, may be of any suitable material which is preferably solid at ordinary room temperature. Suitable materials are exemplified by wood, metal, thermoplastic organic polymers, thermoset organic polymers, both reinforced and non-reinforced, glass, elastomers, and the like.

The outer layer or layers may be applied to the core either as independent sheets of suitable material or as a liquid phase which later solidifies to form a material which is solid at room teperature.

When sheet material is used, the outer layers may be attached by mechanical means such as for example, rivets, screws, and other similar fasteners; pseudo mechanical fastening means may also be used for example soldering, welding or brazing sheet material to the core.

A preferred method of attaching sheet materials to the reinforced core is by use of a suitable adhesive. Adhesive systems which are available in the art may be used. Ordinarily, the adhesive systems are thermosetting organic polymer resins and elastomers. By thermosetting is meant that the fluid polymer resin and/or elastomer can be chemically or thermally cured or hardened forming a solid, substantially infusible material. Many chemical classes of such adhesives are available, for example, polyester resins, epoxy resins, polyurethane resins and elastomers, urea-formaldehyde resins, acrylonitrile resins, phenolic resins, polysulfide systems, ethylene/propylene/diene terpolymers and the like. Any such adhesive system which will effect a good bond between the outer layers and the foamed metal core can be used. The epoxy, the polyester, the polyurethane systems and systems which utilize mixtures of these resins are preferred.

Many different adhesives and cements may be employed to bond the sheet material to foamed aluminum, particularly in the case of the composite article. Typical of the synthetic organic adhesives that may be used in accordance with the present invention are the thermosetting and thermoplastic adhesives. Exemplary of the thermosetting adhesives are phenol-formaldehyde adhesives, resorcinol-formaldehyde adhesives, epoxy resin adhesives, polyisocyanate adhesives, and the like. Typical of the suitable thermoplastic resin adhesives are the polyvinyl adhesives, the acrylic resin adhesives, the polyamide resins, and the like. Also suitable are the two polymer adhesives, such as polyvinyl acetal/phenyl resin adhesives, nitrile rubber/phenolic resin adhesives, neoprene rubber/phenolic resin adhesives, epoxy/nylon adhesives, and the like.

In the adhesives field the term "phenol-formaldehyde resin" is used to designate a condensation product of formaldehyde and a monohydric phenol including especially phenol itself, in addition to cresols and xylenols. Phenol-formaldehyde adhesives may be prepared as disclosed in Adhesion and Adhesives by N. A. Bebruyne and R. Hauwink, Elsevier Publishing Company, New York 1951.

Suitable phenol-formaldehyde adhesives are disclosed in United States Pats. Nos. 2,437,981, 2,727,869, 2,878,197, and 2,988,536, which are hereby incorporated by reference.

Suitable resorcinol-formaldehyde adhesives are disclosed in United States Pats. Nos. 2,385,373, 2,385,374, and 2,478,943, which are hereby incorporated by reference.

The epoxy resin adhesives are characterized by the group:

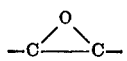

There are two general methods of producing epoxy resins, the first of which includes the addition of a subtance already containing an epoxide group, such as epichlorohydrin (or other epihalohydrin) reacting with a substance having replaceable hydrogen atoms, and the second method includes reacting peracetic acid (or other appropriate oxygen-donating compound) with an olefin compound. The product of the first method is a glycidyl compound, which includes glycidyl ethers, amines and esters, the glycidyl ethers including the bis-phenol A epoxy resins, which are the type usually referred to generally as the epoxy resins. Epoxy adhesives include a liquid or a fusible solid containing epoxide group and a curing agent. The liquid containing epoxide group is mixed with the curing agent immediately before use, and curing begins when the resin and hardener are brought into intimate contact. The bis-phenol A epoxy adhesives adhere to most substances and are the most important of all high strength adhesives. The bis-phenol A epoxy adhesives are described and processes for producing them are disclosed in United States Pats. Nos. 2,500,600, 2,582,985, 2,615,007, and 2,615,008, which are hereby incorporated by reference.

Glycidyl compounds are generally prepared by reacting epichlorohydrin with a substance having a molecular structure which has replaceable hydrogen atoms such as hydroxyl groups. A glycidyl ether

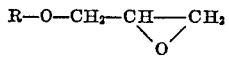

is obtained, the glycidyl compounds of bis-phenol A being the most important example of compound obtained by this reaction. The molecular structure of such a compound is commonly represented thusly:

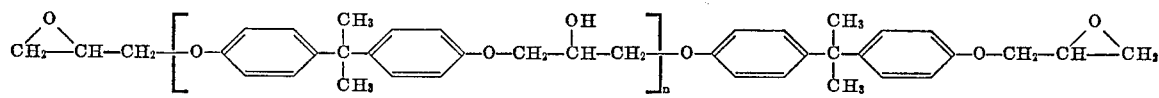

The general procedure for producing an epoxy resin is the following: bis-phenol A (2,2 - (4,4' - dihydroxydiphenyl)-propane) is heated with epichlorohydrin and aqueous sodium hydroxide at a temperature somewhat below the boiling point of aqueous sodium hydroxide. The epoxide group of epichlorohydrin and the hydroxyl group of bis-phenol A react with the resulting formation of a chlorohydrin. Hydrogen chloride is split off from the chlorohydrin and forms sodium chloride and water by reaction with sodium hydroxide. A new epoxy ring is formed as part of the glycidyl ether group.

U.S. Pat. No. 2,500,600 discloses a suitable epoxy resin composition comprising an epoxy ether having a 1,2-epoxy equivalency greater than one which is devoid of other reactive substituents than alcoholic hydroxyl groups, and 5% to 300% of the equivalent amount of a saturated aliphatic diamine of the formula $C_nH_{2n}(NH_2)_2$ wherein $n$ is an integer of at least 4 containing two primary amino groups, one of which is directly linked to a tertiary carbon atom.

Bis-phenol A epoxy adhesives are only useful when cured. The curing process results in cross-linking of the epoxy resins. The substances which will react with bis-phenol A resins to cure the epoxy resin are numerous and consist primarily of compounds containing active hydrogen atoms. In adhesive applications the most valuable hardeners are polyamines and to some extent polycarboxylic acid and hydrides and phenolic resins. Typical of the suitable polyamine class are both aromatic and aliphatic polyamines. The most important polyamines are the homologous alkylene polyamines especially diethylenetriamine and triethylenetetramine. Other suitable amines include N,N-bis-(hydroxy ethyl)diethylenetriamine, N,N-tetramethylethylenediamine, N,N - dimethyl - aminopropylamine, and N,N-diethylaminopropylamine, metaphenylenediamine, 4,4' - diaminodiphenylmethane, 4,4' - diaminodiphenyl sulphone, diaminodiphenylmethane, diaminodiphenyl sulphone, pyromellitic dianhydride, phthalic anhydride, dodecenylsuccinic anhydride, methylenedomethyl-tetrahydrophthalic anhydride, and the like.

Suitable polyisocyanate adhesives are disclosed in United States Pats. Nos. 2,356,005, 2,597,025, and 2,650,212, which are hereby incorporated by reference.

Polyester resin based adhesives are also useful especially those which utilize a peroxide curing agent.

The five most important chemical classes of thermoplastic adhesives are the cellulosic plastics, the vinyl polymers (including polystyrene), the acrylic polymers, the synthetic rubbers, and the polyamines. Frequently, a single adhesive composition will contain a mixture of several of these components. The cellulosic adhesives are not generally used in joining metals to other materials.

The polyvinyl adhesives are widely used in joining metals to other materials. Suitable polyvinyl adhesives include polyvinyl esters such as polyvinyl acetate, the polyvinyl acetals, polyvinyl alcohol, and polystyrene. The most important polyvinyl ester adhesive is polyvinyl acetate.

Suitable polyvinyl acetal adhesives are disclosed in United States Patents 2,036,092, 2,116,635, and 2,496,480, which are hereby incorporated by reference.

Polyvinyl alcohol is not widely used in gluing smoothly finished metals although it is used in gluing coarse materials such as leather, cloth and paper. Due to the porous nature of the surface of foamed aluminum, polyvinyl alcohol may be successfully used in gluing porous materials to foamed aluminum.

Styrene is a vinyl monomer usually made by catalytic dehydrogenation of ethyl benzene. As an adhesive its polymers or copolymers are used in solution or as an aqueous dispersion. Polystyrene does not adhere very well to metals with a smooth finish, but will adhere to foamed aluminum due to the porous nature of the surface of foamed aluminum.

More valuable as adhesives are the copolymers of styrene and butadiene. These copolymers are useful adhesives, especially in the form of aqueous dispersions containing about 50% copolymer. A monomer ratio of about 50:50 may be used. If the ratio of styrene to butadiene is of the order of 60:40 and higher, the copolymer is non-tacky.

Typical of the acrylic resin adhesives which may be used are acrylic acid, methacrylic acid, methyl acrylate, ethyl acrylate, isobutyl acrylate, methyl methacrylate, ethyl methacrylate, and the like. Additional adhesion takes place largely through the tackiness of the dissolved polymer, but if a catalyst such as an organic peroxide is added the monomer subsequently polymerizes. Typical of the formulations of the acrylics which may be used as adhesives are those disclosed in United States Patents 2,859,200, 2,916,469, and 2,962,471, which are hereby incorporated by reference.

Other suitable acrylic resin adhesives include the alkyl cyanoacrylate adhesives, acrylonitrile, acrylamide, and the acrylic copolymers. Suitable alkyl cyanoacrylate adhesives include ethyl 2-cyanoacrylate, methyl 2-cyanoacrylate, and the like. Suitable formulations of the alkyl cyanoacrylates suitable for use as adhesives are disclosed in United States Patents 2,763,585, 2,776,232, and 2,794,788, which are hereby incorporated by reference.

The most important acrylic copolymers are those from acrylonitrile. The acrylonitrile/butadiene copolymer has its widest use in the form of a latex. The monomer ratio in acrylonitriles/butadiene copolymer adhesives is generally selected to give a flexible material. This requires the butadiene to be in excess of the acrylonitrile, and a preferred range is for the butadiene to comprise up to at least 65% by weight.

Polyamide resins vary from medium viscosity liquid to hard thermoplastic solids with molecular weights suitably from about 3,000 to 9,000 and have melting points between 95° C. and 190° C. A polyamide resin composition suitable for use in adhesives is disclosed in United States Patent 2,450,940, which is hereby incorporated by reference.

The types of nylon in common use as fibers are made from a straight-chain diamine and a straight-chain dicarboxylic acid. Used by themselves as adhesives, the nylons are capable of giving fair adhesion to metal and a variety of other materials, including wood.

When preparing a sandwich panel using the adhesive technique an adequate amount of adhesive should be applied over the entire outer layer surface. This is to ensure fullest contact between the adhesive and the outer layer and between the adhesive and the core. Where the foam portion core has no metal skin thereon, better results are obtained when sufficient adhesive is used (1) to fill substantially all the cavities on the core surface, and (2) to provide a thin layer of adhesive over substantially the entire bonding surface. In addition, sufficient pressure is ordinarily applied to the panel sandwich while the adhesive is curing or hardening; and this is to ensure uniform and adequate contact between the adhesive and the surfaces being bonded. The adhesive may be applied to the outer layer sheet surface alone, to the core surface alone, or to both surfaces. Furthermore, the sheet surface may be treated or prepared for applying the adhesive using adhesive art recognized techniques such as acid etching, Parkerizing, metal grit blasting, Bonderizing, sanding, and the like. In the case of metal sheet, the sheets are ordinarily degreased before the adhesive is applied.

As pointed out above, outer layers may also be applied to the present foamed metal core as fluid materials (liquids, pastes, gums, gels and the like) which will harden to a solid outer layer. These materials may simply be substances which are heated to make them fluid and which solidify on cooling. Examples of such materials are acrylonitrile/butadiene/styrene resins, polystyrene, glass, polyethylene and the like. Another example of a suitable material is polyvinylchloride plastisol which is fused by heating after application to the core. Most preferred materials are organic polymers and elastomers which can be chemically and/or thermally cured to form tough, impervious surfaces. Examples of useful polymers and elastomers are the polyester resins, the epoxy resins, the phenolic resins, the urea formaldehyde resins, polyurethane resins, ethylene/propylene/diene terpolymer, diene elastomers, Hypalon, polysulfides, natural rubber and other similar substances. These organic polymers and elastomers may also be used in conjunction with reinforcing material such as fiberglass, flocked fibers, asbestos, powdered metal, wood flour, carbon black and the like.

Various foamed metals may be used as the foam metal portion of the core in the present panel construction. Examples of useful metals are lead, tin, copper, zinc, tantalum, titanium, alloys of these metals such as steel, brass, and the like.

A preferred foamed metal is foamed aluminum. By aluminum is meant substantially pure aluminum as well as aluminum alloys containing 80% or more and preferably 90% or more aluminum. The following aluminum alloys are examples of useful alloys for preparing foam cores:

Alcoa alloy:
  7075 (1.6% Cu, 2.5% Mg, 0.3% Cr, 5.6% Zn, remainder Al)
  2024 (4.5% Cu, 0.6% Mn, 1.5% Mg, remainder Al)
  5086 (0.45% Mn, 4.0% Mg, 0.1% Cr, remainder Al)
  6063 (0.4% Si, 0.7% Mg, remainder Al)
  Almag 35 (6–8% Mg in Al)
  1000 series Al (99.6% minimum Al)
  2011 (5.5% Cu, 0.5% Pb, 0.5% Bi (remainder Al)
  2218 (4.0% Cu, 1.5% Mg, 2% Ni, remainder Al)
  3005 (1.2% Mg, 0.4% Mg, remainder Al)
  4042 (12.2% Si, 0.9% Cu, 1.1% Mg, 0.9% Ni, remainder Al)
Alcoa alloy:
  4043 (5% Si, 95% Al)
  8280 (1.5% Si, 1.0% Cu, 0.5% Ni, remainder Al)
  Magnalium—70% Al, 30% Mg The foamed metals used in the present construction may be prepared by processes known in the art. In general, such processes involve blowing molten metal with a suitable gas generating agent such as lithium hydride, titanium hydride, zirconium hydride and the like. Air properly entrained in a molten metal may also be used in preparing such foam. Where a blowing agent such as a metal hydride is used, a viscosity control additive may be used in the molten metal during the foaming process to help control the foam density pore uniformity. Representative examples of suitable processes for preparing foamed metal are found in U.S. 3,297,431, U.S. 3,300,296, and U.S. 3,305,902.

As pointed out above, foamed aluminum is a most preferred core material. The density of the foamed aluminum may vary over a wide range. Generally, foamed aluminum having a density of less than about 50 p.c.f. can be used. Foams ranging from 5 to 35 p.c.f. are preferred; densities ranging below about 27 p.c.f. are more preferred; foam density ranging from about 8 to about 27 p.c.f. is especially preferred; and foam densities of 15–18 p.c.f. are most preferred.

The present construction features the use of Z-shaped reinforcing elements in the foamed metal core structure. The reinforcing elements, as the figures illustrate, are partially within and are bonded to the foamed metal portion of the core as well as to the outer layers of the sandwich type panel. Bonding of these reinforcing elements to the foamed metal is conveniently achieved using a suitable adhesive system of the type already described above; and a thermoset adhesive is preferred.

The Z-shaped reinforcing elements may be of any material, preferably of the type described as useful for the outer layers of the present construction. These reinforcing elements can be of the same material as the outer layer, or they may be of a different material. Metal reinforcing elements are more preferred; and perforated metal reinforcing elements are most preferred.

The reinforcing elements, as illustrated in the drawings, are Z-shaped and extend continuously from the top face of the foam core down through and onto the bottom face of the foam core. Thus, the reinforcing elements ef fectively join and subtsantially enclose two adjacent foam core sections. This is clearly illustrated in FIG. 1.

The present reinforced sandwich panel construction can be prepared by a number of different methods. One method is to secure the Z-shaped reinforcing elements onto one outer layer of the finished panel construction. Preferably, the outer layer is one that extends around the core to encase it. The inside face of this outer layer and the reinforcing elements then are coated with a suitable adhesive system, such as an amine cured epoxy, or a peroxide cured polyester. The metal prefoam can then be cast or extruded as a fluid into this assembly and allowed to foam. After the foam has solidified, a reinforced panel construction is obtained having only the outer encasing layer. The second outer layer can then be applied and bonded to this integral formed core semi-encased construction to complete the construction.

Another useful method for preparing panels of the present invention involves bonding individual pieces of foamed metal Z-shaped, reinforcing elements; bonding these individual units to form a complete reinforced core; and then to attach outer layers to said bond to complete the composite panel construtcion. This particular method is advantageous since it is a relatively simple procedure; it does not require sophisticated manufacturing equipment; and it provides for flexibility in controlling the number and size of the reinforcing elements, as well as the size and shape of the completed final panel.

Figure 2:
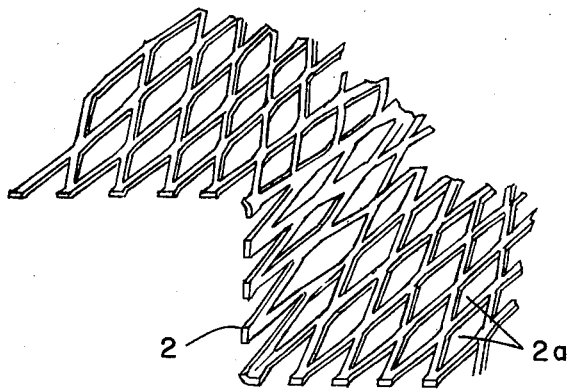

An outstanding feature of the reinforced core panel construction of the present invention is that it is substantially stronger and more resistant to deformation than a comparable construction wherein the foamed metal core is not reinforced. To demonstrate the superior strength of the present construction, sets of sandwich panels of equivalent sizes having reinforced foam core of the present design and unreinforced foam core were prepared. The reinforced foam core used in this set of panel constructions was prepared by bonding three a ½" by 24" by 1" piece of a foamed aluminum having a density of 17–18 p.c.f. to two Z-shaped reinforcing elements. The reinforcing elements were made of perforated ¾" diamond steel (as illustrated in FIG. 2). The adhesive used to bond the foam to the Z-shaped elements was a commercial thermosetting adhesive system identified by the manufacturer as "Fuller FE 073–9." This assembled reinforced core was then bonded to a 40 mil (1 mil=0.001 in.) sheet of 6061–T-6 aluminum alloy, which extended around to enclose three sides of said core (see FIG. 1). The same "Fuller FE 073–9" adhesive was used. This semi-encased construction was then coated with a fiberglass mat reinforced polyester resin to form the second outer layer. The finished sandwich panel construction was an 11" by 24" rectangle, 1¼" thick. This was identified as Example 1 Panel.

An analogous panel using the same foamed aluminum (13 p.c.f.), the same adhesive, the same encasing aluminum alloy outer layer and the same fiberglass mat reinforced outer layer was prepared; this unreinforced core sandwich panel was also an 11" by 24" rectangle having a thickness of 1¼". This was identified as Example 2 Panel.

To demonstrate the improved strength of the present construction, the two of sandwich panels (Example 1 Panel and Example 2 Panel) were tested as follows. The test set up simulates floor construction on utility supports on 15 inch centers.

Two I-beams (parallel sides=2¼" long) were set parallel to each other, 15" apart, measurer from center of one beam to the center of the other. The 24" by 11" by 1¼" panel was then set on these supports and centered with the 11" dimension parallel to said supports. A 4" by 7" rectangular metal foot was then set and substantially centered on said supported panel, with the 7" dimension parallel to the supports. This foot was then incrementally loaded via an Instrom tester. The load in pounds, at failure was obtained and recorded. Data thus obtained is tabulated below:

TABLE 1.—STRENGTH DATA

| Panel example | Reinforced core | Load at failure [1] (lbs.) |
| --- | --- | --- |
| 1 | Yes | 6,750 / 7,150 |
| 2 | No | 2,200 / 2,600 |

[1] Duplicate runs were made.

The data in Table 1 clearly illustrates the improved strength of the present reinforced core panel construction. The reinforced core panel load at failure was almost 300% greater than the analogous unreinforced core panel. The reinforced panel construction also has an exceptionally low weight/sq. ft. of 2.75 lbs. Thus, the present composite reinforced metal foam core panel provides a construction having improved load carrying capacity and rigidity while maintaining all the good features such as, strength/weight ratio, resistance to deterioration caused by ordinary weathering and aging, fire resistance, of an unreinforced metal foam core panel.

The drawings illustrate a construction which has two full Z-shaped reinforcing elements and portions of two other Z-shaped elements. This does not limit the present construction and panels having only one and more than two Z-shaped reinforcing elements can be and are encompassed by the present invention.

The present panel construction has myriad uses and especially for super heavy duty flooring application in trucks, commercial buildings, airplanes, boats and the like; in load bearing wall construction; in roof construction.

Claims to the invention described herein follow.

I claim:

1. Composite sandwich panel type construction having two outer layers attached to opposite sides of a foamed metal core having Z-shaped reinforcing elements partially enclosed in said foamed metal and positioned so that the parallel sides of said reinforcing elements are (1) bonded to opposite sides of said metal foam, and (2) parallel to said outer layers.

2. The construction of claim 1 wherein one of said outer layers extends around and substantially encases said core.

3. The construction of claim 1 wherein said foamed metal is foamed aluminum.

4. The construction of claim 3 wherein said foamed aluminum has a density ranging from about 5 pounds per cubic foot to about 35 pounds per cubic foot.

5. The construction of claim 1 wherein said outer layers are of materials independently selected from wood, metal, glass, thermoplastic organic polymers, thermoset organic polymers, and elastomers.

6. The construction of claim 5 wherein said foamed metal is a foamed aluminum.

7. The construction of claim 6 wherein said outer layers are attached to said core with an adhesive.

8. The construction of claim 7 wherein said outer layers are discrete sheets.

9. The construction of claim 8 wherein both of said outer layers are aluminum.

10. The construction of claim 8 wherein one of said outer layers is metal sheet and the other outer layer is fiberglass reinforced thermoset organic polymer.

11. The construction of claim 10 wherein said metal sheet is aluminum alloy.

12. The construction of claim 1 wherein said Z-shaped reinforcing elements are perforated metal.

13. The construction of claim 12 wherein said foamed metal is a foamed aluminum.

14. The construction of claim 13 wherein said foamed aluminum has a density ranging from about 5 pounds per cubic foot to about 35 pounds per cubic foot.

15. The construction of claim 14 wherein said metal sheet extends around and encases said core.

16. The construction of claim 15 wherein said metal outer layer is bonded to said core with a thermoset adhesive.

17. The construction of claim 16 wherein said adhesive is fiberglass filled.

18. The construction of claim 15 wherein said reinforcing elements are bonded to said foamed metal with a thermoset adhesive.

19. The construction of claim 18 wherein said metal outer layer is 20–50 mils thick.

References Cited

UNITED STATES PATENTS 3,617,364  11/1971  Jarema et al. _____ 161—160

WILLIAM J. VAN BALEN, Primary Examiner

U.S. Cl. X.R.

75—20 F; 161—161, 213